United States Patent [19]

Schreiner

[11] Patent Number: 5,440,310
[45] Date of Patent: Aug. 8, 1995

[54] BANDWIDTH SYNTHESIZED RADAR LEVEL MEASUREMENT METHOD AND APPARATUS

[75] Inventor: Stephan Schreiner, Maricopa, Ariz.

[73] Assignee: Motorola, Inc., Schaumburg, Ill.

[21] Appl. No.: 195,510

[22] Filed: Feb. 14, 1994

[51] Int. Cl.$^6$ ............................................. G01S 13/34
[52] U.S. Cl. .................................. 342/124; 342/132; 73/290 R
[58] Field of Search ............... 342/124, 128, 130, 132, 342/85, 87; 73/290 R

[56] References Cited

U.S. PATENT DOCUMENTS

| | | | |
|---|---|---|---|
| 3,428,815 | 2/1969 | Thompson | 250/217 |
| 3,447,374 | 6/1969 | Cohn et al. | 73/290 |
| 3,884,074 | 5/1975 | Robertsson | 73/290 V |
| 3,888,588 | 6/1975 | Granqvist | 356/5 |
| 4,044,353 | 8/1977 | Levy | 343/12 R |
| 4,044,355 | 8/1977 | Edvardsson | 343/14 |
| 4,106,020 | 8/1978 | Johnson | 343/14 |
| 4,170,311 | 10/1979 | Spaw | 414/289 |
| 4,205,315 | 5/1980 | Fleenor | 343/14 |
| 4,245,221 | 1/1981 | Kipp et al. | 343/17.7 |
| 4,360,812 | 11/1982 | Peperone | 343/14 |
| 4,569,599 | 2/1986 | Bolkow et al. | 368/120 |
| 4,641,139 | 2/1987 | Edvardsson | 343/124 |
| 4,665,403 | 5/1987 | Edvardsson | 342/124 |
| 4,807,471 | 2/1989 | Cournane et al. | 73/290 R |
| 4,833,918 | 5/1989 | Jean et al. | 73/290 V |
| 4,901,245 | 2/1990 | Olson et al. | 364/509 |
| 4,973,966 | 11/1990 | Zeewy | 342/124 |
| 5,070,730 | 12/1991 | Edvardsson | 73/290 |
| 5,115,242 | 5/1992 | Nagamune et al. | 342/124 |
| 5,136,299 | 8/1992 | Edvardsson | 342/124 |
| 5,148,177 | 9/1992 | Nagamune et al. | 342/124 |
| 5,182,565 | 1/1993 | Nagamune et al. | 342/124 |

OTHER PUBLICATIONS

An article entitled "Microwave Radar Targets Tough Application" by D. Robertson, INTECH Industry, Mar. 1992, INTECH, pp. 39–40.
An article entitled "Radar Gauges Applied to Difficult Tank Gauging Applications" by W. Oglesby, ENRAF Nonius Tank Inventory Systems, Inc., ©1989, pp. 1879–1890.
An article entitled "Radar Level Now Comes in a Hole New Size!", TN Technologies, Inc., A Baker Hughes Company, ©1991 TN Technologies, Inc.
An article entitled "Using Radar Level Measurement for Increased Environmental Protection and Plant Safety" by J. L. Daniewicz, TN Technologies, Inc., ©1991, Instrument Society of American Reprinted with permission from, *Advances in Instru. & Ctrl.*, vol. 46, Part 2, pp. 1201–1211.
An article entitled "Vapour-Phase Mass Measurements in Tanks" by O. Edvardsson, Saab Marine Electronics AB, ©, 1992-Paper #92-0389, pp. 1133–1135.
An article entitled "A Comparative Analysis: Volume and Mass Derived from Tank Gauging Systems" by W. Oglesby, ENRAF Nonius Tank Inventory Systems, ©ISA, 1989-Paper #89-0665, pp. 1493–1504.

(List continued on next page.)

*Primary Examiner*—Ian J. Lobo
*Attorney, Agent, or Firm*—Jeffrey D. Nehr

[57] ABSTRACT

A bandwidth synthesized radar level measurement system includes a transceiver for generating a transmitted signal and a sweep signal. An antenna coupled to the transceiver sends the transmitted signal toward a level corresponding to a product surface and receives a reflected signal therefrom. A sweep generator generates a chirp slope signal in response to the reflected signal. An intermediate frequency (IF) processor receives the chirp slope signal and a difference signal mixed from the transmitted and reflected signals. The IF processor produces an amplified IF signal and a sweep control receives the amplified IF signal to adaptively control the sweep generator and to produce an output signal including a distance from the antenna to the level corresponding to the product surface.

21 Claims, 3 Drawing Sheets

OTHER PUBLICATIONS

An article entitled "A Description of a New Radar Tank Gauge and the Methods used to Facilitate Installation" by H. G. Westerlind et al., ©ISA, 1992–Paper #92–0391, pp. 1141–1148.

An article entitled "Calibration and Accuracy of Radar Level Gauges" by O. Edvardsson, Saab Marine Electronics AB, ©ISA, 1992–Paper #92–0390, pp. 1137–1140.

An article entitled "Continuous Level Measurement Using Phase Tracking" by T. Cournane et al., *Measurements & Control*, Jun., 1993, pp. 110–113.

An article entitled "Level Gauging by Radar" by H. G. Westerlind, ©ISA, 1989–Paper #89–0644, pp. 1385–1396.

An article entitled "Microwave Radar Level" by L. Kolbert, TN Technologies, Inc., A Baker Hughes Company, ©1991 TN Technologies, Inc.

BANDWIDTH SYNTHESIZED RADAR LEVEL MEASUREMENT METHOD AND APPARATUS

FIELD OF THE INVENTION

This invention relates in general to measurement of materials in tanks and in particular to bandwidth synthesized radar level measurement.

BACKGROUND OF THE INVENTION

The measurement of products or materials in tanks or silos is important for inventory control and custody transfer in many industries. Product level monitoring is also important in filling a storage device because overfilling and spillage of potentially hazardous products must be avoided. Similarly, level monitoring can be used to detect tank leakage; e.g., large unattended oil or gasoline storage tanks must be closely monitored for possible seepage which would cause contamination of soil and ground water.

Also, as the storage device is filled, the product level must be monitored to avoid overfilling and spillage of the potentially hazardous product. Large unattended oil storage tanks must be closely monitored for possible seepage which would cause contamination of the soil and ground water.

The standard practice of measuring the level in a storage vessel is to lower a stick or a rope into the vessel until the product is touched. By measuring the extended length the actual level of the product or material in the tank can be determined. This is usually called "sticking the tank". A quite common example of "sticking the tank" occurs when a gasoline station attendant measures the level of a gasoline storage tank by inserting a calibrated stick into the tank and removing it to see how much of its length is wet. Such a procedure is potentially a potentially very dangerous procedure and vents the tank contents to the atmosphere, which is undesirable. Although many of the newer measuring devices which use the stick or rope concept are automated and quite accurate, such devices typically require a physical intrusion into the storage environment. Such breaching of the tank raises the possibility of the contamination of the storage vessel contents and, depending on the corrosive nature of the vessel contents, could impair or destroy the measuring device.

Since the early 1970s, various level measuring devices using radar techniques have been developed to eliminate the necessity of the measuring device touching the storage vessel contents. Typical radar level measuring devices use frequency modulated continuous wave (FM-CW) signal wave forms in which the frequency of the transmitted signal is swept at a constant rate over about 1 gigahertz (GHz) around its center frequency. The reflected signal which, due to the time delay caused by the signal traveling from the transmitter to the storage vessel contents and traveling back to the receiver upon reflection from the contents' surface, will be at a different frequency than the presently transmitted signal which, during the transit time, was swept to a different frequency. The difference in frequency between the transmitted and received frequency is an indication of how far the initial transmitted signal had to travel, and thus the distance to the storage vessel contents can be determined. In such systems the minimum resolution of the measurement and the minimum measurable distance is directly related to the sweep width of the transmitted signal. Also, since the return signal is modulated by the chirp, the required detection bandwidth must be wide, decreasing the signal-to-noise ratio and thereby limiting the maximum range.

The U.S. Federal Communications Commission (FCC) and international regulations limit the maximum bandwidth of the transmitted signal (at the required power levels to overcome the path loss) to 250 megahertz (MHz). Current equipment, employing fixed sweep rates and fixed sweep lengths, cannot resolve or filter out fractions of return signal cycles. These fractions of cycles occur when the sweep, which is not synchronized with the return signal, reverses or resets before a complete cycle is received. Therefore, these systems exhibit significantly lower signal-to-noise ratios and require at least a 1 GHz bandwidth.

What is needed is a method and apparatus to provide an inexpensive and highly accurate measurement for the level of a product in a storage tank or silo using microwave signals given the FCC and international regulations constraint of maximum bandwidth of the transmitted signal of 250 MHz, in a system which can resolve closely spaced echoes and exhibit good signal-to-noise-ratio.

DETAILED DESCRIPTION OF THE DRAWINGS

Generally, the present invention provides a method and apparatus for bandwidth synthesized radar level measurement. The method and apparatus uses a microwave signal that is swept in frequency at an adaptively controlled rate. Adjustment of sweep parameters is made on a sweep-to-sweep basis such that the ranging frequency signal contains an integer number of sinusoidal cycles per sweep period and the starting and ending phase of the ranging sinusoidal signal is zero. The ranging signals from successive sweeps are added in phase, thereby synthesizing a ranging signal which can be processed in a filter. The result, in effect, gives the device a synthesized bandwidth equal to the number of successive sweeps times the actual sweep bandwidth.

Figure 1:
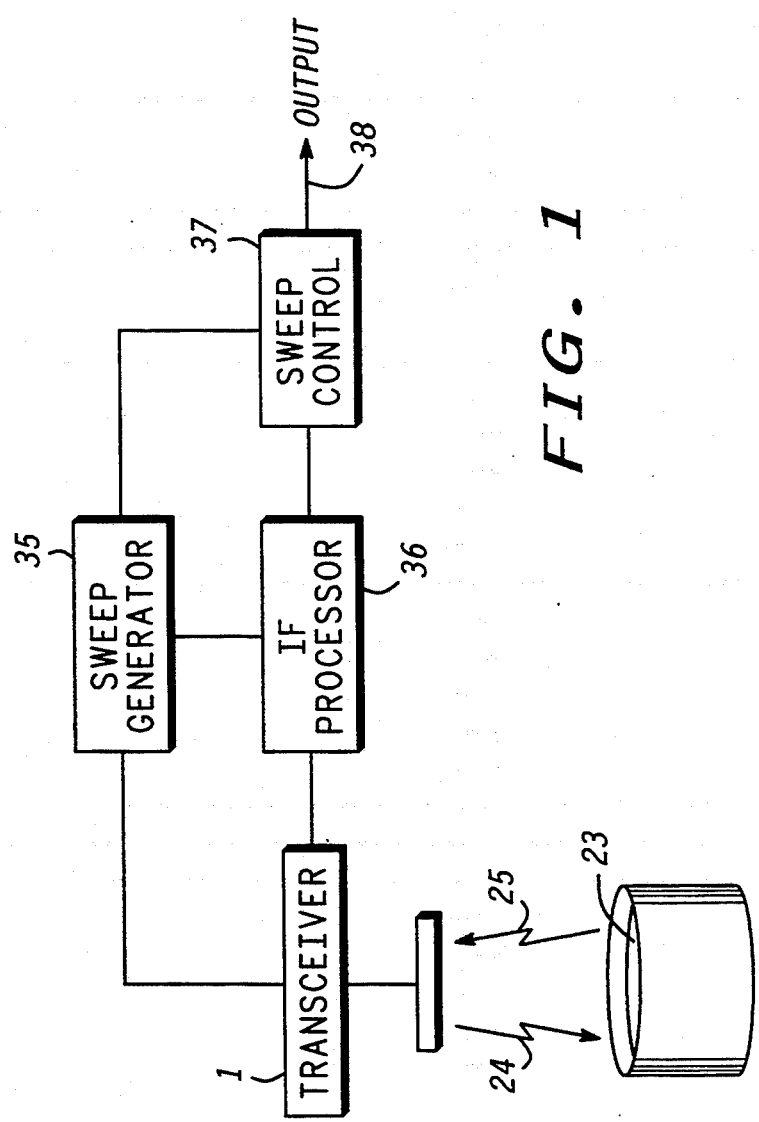
FIG. 1 is a high-level block diagram of a bandwidth synthesized radar level measurement system in accordance with a preferred embodiment of the invention.

The level measuring apparatus in FIG. 1 can mount into an existing roof port or standpipe of a storage tank or silo. The antenna is typically directed downward from the roof port or standpipe at the top of the storage tank or silo towards the uppermost surface of the contents. The transmitter/receiver and signal processor electronics can be mounted behind the antenna in a small, explosion-proof housing.

The present invention can be more fully understood with reference to the figures. FIG. 1 is a high-level block diagram of a bandwidth synthesized radar level measurement system in accordance with a preferred embodiment of the invention and illustrates the overall structure and function of the level measuring apparatus. Transceiver 1 is coupled to antenna 3, to sweep generator 35, and to intermediate frequency (IF) processor 36.

Sweep control 37 is coupled to both IF processor 36 and sweep generator 35. Sweep control 37 produces output signal 38.

Radio frequency (RF) transceiver 1 in FIG. 1, whose frequency is controlled by sweep generator 35, transmits a transmitted signal 24 through antenna 3 to the product surface 23. It is the distance from the antenna 3 to the product surface 23 which is to be measured. The transmitted signal 24 is reflected by the product surface 23 and returns to the antenna 3 as the return or reflected signal 25. A difference signal 26, i.e. the difference between transmitted signal 24 and reflected signal 25, is output from the transceiver 1. The difference signal 26 output of the transceiver 1 is input to the IF processor 36. In the IF processor 36, the difference signal 26 is filtered, amplified and then routed to the sweep control 37. The sweep control 37 has two outputs: the first is the sweep adjust signal 30 routed to the chirp slope generator 13, the second is the output signal 38 which contains the ranging information (distance from the antenna 3 to the product surface 23).

Figure 2:
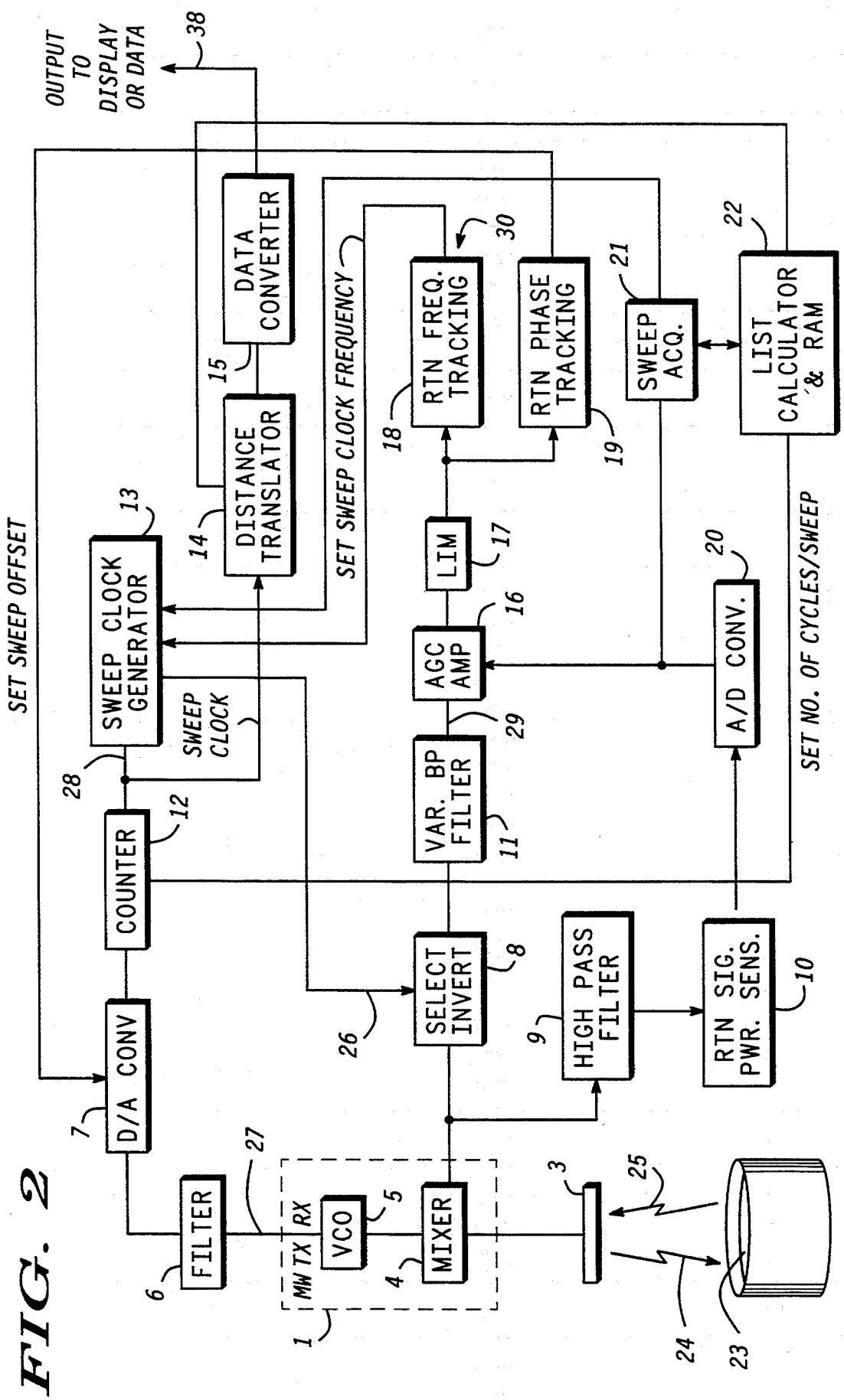
FIG. 2 is a expanded block diagram of the bandwidth synthesized radar level measurement system illustrated in FIG. 1.

FIG. 2 is a expanded block diagram of the bandwidth synthesized radar level measurement system illustrated in FIG. 1. The microwave transceiver 1 is a swept frequency generator which, when driven by a chirp slope generator 13, will produce a carrier frequency which changes over a range of approximately 200 MHz in synchronism with the sweep signal 27. Transceiver 1 in FIG. 2 comprises voltage controlled oscillator (VCO) 5 coupled to mixer 4 to process the microwave transmitted signal 24 and received signal 25. Mixer 4 is coupled to antenna 3 and to return signal power sensor 10.

VCO 5 is coupled through the serially connected combination of filter 6 and digital to analog (D/A) converter 7 to sweep generator 35. (Filter 6 and D/A converter 7 filter and convert the sweep signal 27 go a digital signal input to counter 12.) Sweep generator 35 in FIG. 2 comprises counter 12 coupled to chirp slope generator 13. Counter 12 is coupled to D/A converter 7, and chirp slope generator 13 is coupled to counter 12.

IF processor 36 in FIG. 2 comprises selectable inverter 8, variable bandpass filter 11, and adjustable gain control (AGC) amplifier 16. Selectable inverter 8 is coupled to mixer 4. Variable bandpass filter 11 is coupled between selectable inverter 8 and AGC amplifier 16.

Sweep control 37 in FIG. 2 comprises distance translator 14, data converter 15, return frequency tracking 18, return phase tracking 19, sweep acquisition 21, and distance calculation/random access memory (RAM) 22. AGC amplifier 16 is coupled to return frequency tracking 18 and to return phase tracking 19. Return signal power sensor 10 is also coupled to and produces an input to both AGC amplifier 16 and sweep acquisition 21.

Counter 12 is coupled to distance calculation/RAM 22. The output of counter 12 (clock signal 28) is coupled to the distance translator 14. Chirp slope generator 13 is coupled to selectable inverter 8, to return frequency tracking 18, and to sweep acquisition 21. The output of return phase tracking 19 is coupled to D/A converter 7, the output of distance calculation/RAM is coupled to distance translator 14, and the output of distance translator 14 is coupled to data converter 15. Data converter 15 produces output signal 38.

The chirp slope generator 13 in FIG. 2 produces a linear chirp function (chirp slope signal) of variable slope and magnitude and controls the frequency of the transceiver 1 through the sweep signal 27. The frequency deviation of the transceiver 1 is a function of the sweep signal 27 magnitude, and the speed of the frequency change is a function of the sweep signal 27 slope. The transmitted swept frequency RF signal 24 is radiated by the antenna 3, reflected by the product 23, and travels back to the antenna 3 as the received signal 25. From the antenna 3, the received signal 25 is routed back to the transceiver 1 where it is mixed with the transmit signal producing a difference signal 26 from the mixer 4. This difference signal 26 is routed to the IF processor 36. In the IF processor 36, the difference signal 26 selectively inverted in selectable inverter 8 in accordance with the chirp slope signal to produce a selectable inverter output, filtered in variable bandpass filter 11 to create a continuous IF signal 29, and amplified in AGC amplifier 16 to produce an amplified IF signal 39.

Narrow bandpass filtering, which can be accomplished on a continuous sine wave, rejects other difference frequencies which are close in frequency and represent false echoes (e.g., structural members in the storage vessel). The resulting continuous IF signal 29 in FIG. 2 is routed to the sweep control 37. In the sweep control 37, the frequency of the difference signal 26 is determined. From the frequency determination, a sweep adjust signal 30 is established in the return frequency tracking 18. This sweep adjust signal 30 is routed to the chirp slope generator 13, where the chirp slope and chirp magnitude are adjusted in such a way that the signal into the IF processor 36 represents a continuous sine wave. The sweep control 37 also produces an output 38 which, after conversion, indicates the range between the antenna 3 and the product surface 23.

In FIG. 2, an alternative to the combination of the microwave transmit function elements (chirp slope generator 13, counter 12, D/A converter 7, filter 6, and VCO 5) could be obtained by a lower frequency precision swept oscillator. For example, a numerically controlled oscillator whose output frequency signal is multiplied up to the desired transmit frequency 24 could be used.

In function, the frequency modulated signal comprising transmitted signal 24 radiated by the antenna 3 in FIG. 2 is returned or reflected back from the product surface 23 to the antenna 3 using the same antenna 3 as receive antenna. Separate transmit and receive antennas could be used, depending on the implementation of the transceiver 1.

The return signal in FIG. 2 is routed back into the transceiver 1 where it is mixed with the transmit signal which, due to the delay of the return signal, will be at a slightly different frequency. The exact frequency difference of the two signals depends first on the distance to and from the product surface 23, and second on the slope of the sweep signal 27 out of the chirp slope generator 13 (which changes the transmit frequency of the transmitted signal 24 at a controlled rate). After the two signals are mixed, the resulting difference signal 26 is routed to the IF processor 36.

Figure 3:
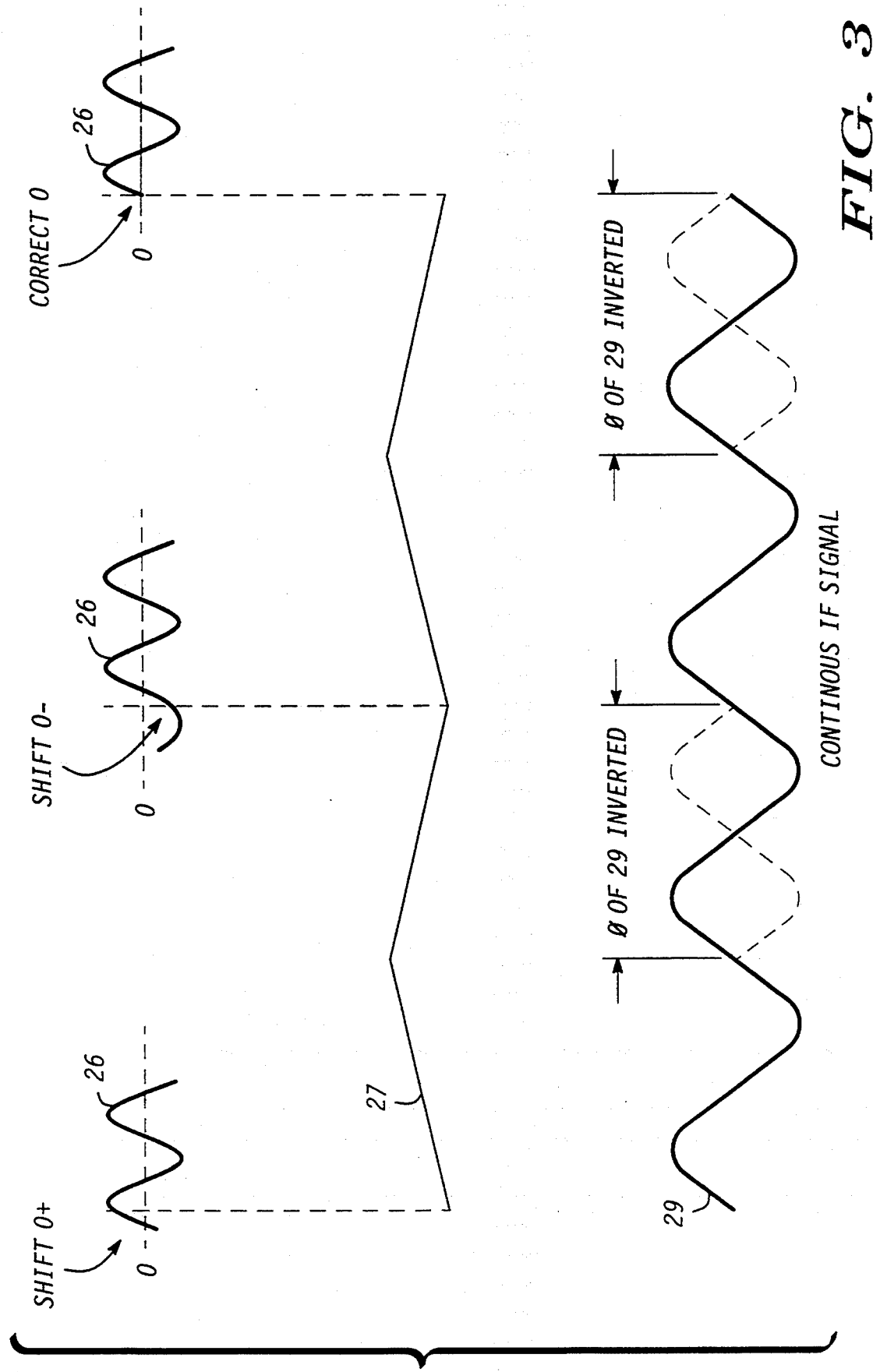
FIG. 3 is a diagram illustrating the phase of the difference signal processed by the bandwidth synthesized radar level measurement system in FIGS. 1 and 2.

The sweep control 37 adaptively controls the sweep generator 35 to "synthesize" increased bandwidth from a series of sweeps. The IF signal processing unit (IF processor 36) and sweep control 37 perform the following major functions (summarized here and explained in greater detail below):

1. Sweep acquisition—the sweep acquisition function 21 continuously adjusts the chirp slope and chirp length until a difference signal 26 at the intermediate frequency is detected;

2. Return signal phase tracking—the return phase tracking function 19 offsets the average DC level of the sweep until the difference signal 26 sine wave starts at the crossover point at the beginning of the upward chirp; the upper and central portions of FIG. 3 illustrate the adjustment of the difference signal 26 from above to below to the proper position of the crossover point of the difference signal 26 occurring at the beginning of the upward chirp (sweep signal 27);

3. Frequency tracking—the difference signal 26 tracking function 18 adjusts the slope of the chirp 27 until the difference signal 26 is exactly at the fixed intermediate frequency of the system. Also, the frequency tracking 18 function adjusts the length of the chirp until there is the maximum possible number of full cycles of the intermediate frequency received during the upward and downward slopes of the chirp;

4. Data translation—the data translation function 14 converts the sweep signal slope, along with previously stored correction and preset data, into a digital number which actually represents the distance to the product. This digital number is converted into a number representing distance to the product in meters or feet in the data converter 15.

To explain in greater detail, consider that in order to obtain an difference signal 26 in FIG. 2 which consists of a continuous sine wave and has the proper frequency for processing in the variable bandpass filter 11, the transmitted signal 24 must be swept at a precisely defined sweep slope. The correct sweep slope depends on the distance to the product. Since, initially, the distance is not known, a rough estimate is made by measuring the received signal 25 power return signal power sensor 10. Then a chirp slope sweep is initiated by the sweep acquisition function 21, which by its sweep acquisition output continuously changes the slope of the sweep signal 27, thereby changing the difference signal 26 until it falls within the pass band of the variable bandpass filter 11. At this point, the chirp slope sweep is stopped, freezing the slope of the sweep signal 27 at its current steepness, and the return phase tracking function 19 samples the phase of the amplified IF signal 39 (containing difference frequency signal 26) during the low frequency sweep signal reversal 27, adjusting the DC offset of the sweep signal 27 (i.e., setting a sweep offset).

Since offsetting of the sweep signal 27 changes the mean carrier frequency of the chirped transmitted signal 24, the phase of the difference signal 26 will change as shown in FIG. 3. This operation is performed over several chirps and gradually adjusts the phase of the difference signal 29 until it starts at its zero crossing. At this point, the sweep signal 27 slope, being the determining factor of the frequency of the difference signal 26, corresponds roughly to the distance to the product surface 23 in FIG. 2. From the distance indication, the distance calculation/RAM 22 determines how many complete cycles of the difference signal 26 will fit into one chirp. This number is preset into the counter 12 and limits the length of the sweep signal 27.

At the zero crossing of the last difference signal 26 cycle, the counter 12 in FIG. 2 is switched into the countdown mode, causing the sweep signal 27 to reverse. At the same time the selectable inverter 8 is commanded to invert the difference signal 26. This process produces a continuous IF signal 29 at the variable bandpass filter 11 and AGC amplifier 16 in FIG. 2. (See FIG. 3 for a depiction of the changing difference signal 26 and the continuous IF signal 29). The frequency of the continuous IF signal 29 is compared with that of a precision crystal oscillator in return frequency tracking 18. The resulting set sweep clock frequency 30 output fine tunes the chirp slope generator 13 in such a way that the difference signal 26 is at its precise center frequency (sets the sweep clock frequency). If the difference signal 26 is too high, the sweep signal 27 slope is too steep, meaning that the transmitted signal 24 has changed too much in frequency before the returned signal 25 had traveled the distance to and from the product 23. The inverse is true for a condition where the difference signal 26 is too low.

When the difference signal 26 starts at the correct phase i.e. it crosses the zero line at exactly the same time the sweep signal 27 is at the lowest value (as shown in FIG. 3), the variable bandpass filter 11 in FIG. 2 is narrowed to improve the signal-to-noise ratio and to reject nearby false echoes. With all these adjustments completed, the slope of the sweep signal 27 is an accurate representation of the distance to the reflecting surface 23. In many cases this distance will not be the distance to the real product, however. The distance could be a reflection from other disturbances within the storage tank or silo such as structural crossbars or agitator blades. For this reason, the acquired reading of distance and the signal strength of the difference signal 26 is stored in the signal processor RAM portion of distance calculation/RAM 22 and the chirp continues sweeping its slope, searching for signals at an increased range. The distance calculation/RAM sets the number of cycles per sweep and the sweep acquisition output. When other difference signals 26 are detected at different distances, the locking process is repeated and the new distances and their corresponding signal strengths are again stored in RAM.

When the maximum distance has been reached, all the stored data is compared for "best fit" regarding distance vs. signal strength. The expected signal strength for a given distance is very predictable since the reflection coefficient of the product is known. Typically, an unwanted reflection from a structural crossbeam or from agitator blades is weaker, for a given distance, than the return from a well defined material or liquid. Thus, when all the acquired signals are compared, the correct distance can be determined with good results. Also, with the aid of digital signal processing, the continuous IF signal 29 can be analyzed for its frequency components, exposing false echoes. When the "best fit" determination has been made for a certain distance, the sweep ramp slope and length required for this distance are set and the system will then lock to the correct return signal. The distance translator 14 receives the clock signal 28 and the distance calculation/RAM 22 distance calculation output and produces a distance signal therefrom. Data converter 15 receives the distance signal and produces the output signal 38.

The above described acquisition procedure normally only needs to be performed after the system is turned on or if a failure has occurred. Once the system is locked in this manner, it will continuously track rising or falling product levels by adjusting the slope of the ramp and, when appropriate, lengthening or shortening the ramp to include or exclude another cycle of the difference signal 26.

All previously stored distance/signal strength inputs are kept in RAM to aid in proper true signal determination when the level of the product rises or falls to the same level as one of the false reflections. The distance translator 14 converts the clock frequency into a quantitative digital number which is converted in data converter 15 to the required bus protocol and then is displayed on a "distance" or "level" readout and/or transmitted to a remote location as output signal 38 in FIG. 2.

As has been shown, this implementation provides a single frequency, continuous sine wave radar return signal instead of a wide band frequency spectrum which is modulated by the transmitter frequency sweep. The use of multiple sweeps essentially synthesizes increased bandwidth. The single frequency continuous sine wave can easily be filtered, providing high rejection of false echoes and an improved signal.

Thus, a method and apparatus for bandwidth synthesized radar level measurement has been described which overcomes specific problems and accomplishes certain advantages relative to prior art methods and mechanisms. The improvements over known technology are significant. The method and apparatus use a waveform that can be generated inexpensively and that meets all FCC (limited bandwidth) and international requirements. All digital processing after the first receiver amplifier minimizes measurement error contributions and reduces the required number of parts.

Thus, there has also been provided, in accordance with an embodiment of the invention, a method and apparatus for bandwidth synthesized radar level measurement that fully satisfies the aims and advantages set forth above. While the invention has been described in conjunction with a specific embodiment, many alternatives, modifications, and variations will be apparent to those of ordinary skill in the art in light of the foregoing description. Possible applications could encompass a wide variety of distance measuring instrumentation, including level measurement, altimeter, anti-collision radar, etc. Accordingly, the invention is intended to embrace all such alternatives, modifications, and variations as fall within the spirit and broad scope of the appended claims.

What is claimed is:

1. A bandwidth synthesized radar level measurement system comprising:
   a transceiver for generating a transmitted signal;
   an antenna coupled to the transceiver, the antenna for sending the transmitted signal toward a level corresponding to a product surface and for receiving a reflected signal therefrom;
   a sweep generator coupled to the transceiver, the sweep generator for receiving a sweep signal and for generating a chirp slope signal in response thereto;
   an intermediate frequency (IF) processor coupled to the sweep generator and to the transceiver, the IF processor for receiving the chirp slope signal and a difference signal comprising a difference between the transmitted signal and the reflected signal and for producing an amplified IF signal; and
   a sweep control coupled to the sweep generator and to the IF processor, the sweep control for receiving the amplified IF signal, for adaptively controlling the sweep generator with the sweep signal, and for producing an output signal including a distance from the antenna to the level corresponding to the product surface.

2. A bandwidth synthesized radar level measurement system as claimed in claim 1, wherein the transceiver comprises:
   a voltage controlled oscillator (VCO) for generating the sweep signal; and
   a mixer coupled to the VCO, the mixer for mixing the transmitted signal and the reflected signal to produce the difference signal.

3. A bandwidth synthesized radar level measurement system as claimed in claim 1, wherein the sweep generator comprises:
   a counter for receiving the sweep signal and for producing a clock signal; and
   a chirp slope generator coupled to the counter, the chirp slope generator for receiving the clock signal and for generating the chirp slope signal.

4. A bandwidth synthesized radar level measurement system as claimed in claim 3, wherein the IF processor comprises a selectable inverter for receiving the chirp slope signal and the difference signal and for producing a selectable inverter output.

5. A bandwidth synthesized radar level measurement system as claimed in claim 4, wherein the IF processor further comprises a variable bandpass filter coupled to the selectable inverter, the variable bandpass filter for receiving the selectable inverter output and for producing a continuous IF signal.

6. A bandwidth synthesized radar level measurement system as claimed in claim 5, wherein the IF processor further comprises an automatic gain control (AGC) amplifier coupled to the variable bandpass amplifier, the AGC amplifier for receiving the continuous IF signal and for producing the amplified IF signal.

7. A bandwidth synthesized radar level measurement system as claimed in claim 4, further comprising:
   a filter coupled to the VCO; and
   a digital to analog (D/A) converter coupled to the filter and to the counter, such that the sweep signal passes through the filter and the D/A converter before entering the counter.

8. A bandwidth synthesized radar level measurement system as claimed in claim 7, further comprising a return signal power sensor coupled to the mixer for monitoring the received signal.

9. A bandwidth synthesized radar level measurement system as claimed in claim 8, wherein the sweep control comprises a return frequency tracking coupled to the chirp slope generator and to the AGC amplifier, the return frequency tracking for receiving the amplified IF signal and for setting a sweep clock frequency in the chirp slope generator.

10. A bandwidth synthesized radar level measurement system as claimed in claim 9, wherein the sweep control further comprises a return phase tracking coupled to the AGC amplifier and to the D/A converter, the return phase tracking for receiving the amplified IF signal and for setting a sweep offset in the D/A converter.

11. A bandwidth synthesized radar level measurement system as claimed in claim 9, wherein the sweep control further comprises a sweep acquisition coupled to the return signal power sensor and to the chirp slope generator, the sweep acquisition for controlling the chirp slope generator in response to the received signal and for producing a sweep acquisition output.

12. A bandwidth synthesized radar level measurement system as claimed in claim 11, wherein the sweep control further comprises a distance calculation/random access memory (RAM) coupled to the counter and to the sweep acquisition, the distance calculation/RAM for setting a number of cycles per sweep and the sweep acquisition output and for producing a distance calculation therefrom.

13. A bandwidth synthesized radar level measurement system as claimed in claim 12, wherein the sweep control further comprises a distance translator coupled to the counter and to the distance calculation/RAM, the distance translator for receiving the clock signal and the distance calculation and for producing a distance signal therefrom.

14. A bandwidth synthesized radar level measurement system as claimed in claim 13, wherein the sweep control further comprises a data converter coupled to the distance translator, the data converter for receiving the distance signal and for producing the output signal therefrom.

15. A method for bandwidth synthesized radar level measurement comprising the steps of:
generating a transmitted signal in a transceiver;
sending the transmitted signal from an antenna toward a level corresponding to a product surface using an antenna;
receiving a reflected signal from the level corresponding to the product surface;
mixing the transmitted signal and the reflected signal to form a difference signal;
receiving a sweep signal in a sweep generator;
generating a chirp slope signal in response to the sweep signal;
receiving the chirp slope signal and the difference signal in an IF processor;
producing an amplified IF signal from the IF processor;
receiving the amplified IF signal in a sweep control; and
adaptively controlling the sweep generator with the sweep control using the sweep signal, wherein a phase of the difference signal is adjusted until a slope of the sweep signal can be used to determine a distance from the antenna to the level corresponding to the product surface.

16. A method for bandwidth synthesized radar level measurement as claimed in claim 15, further comprising the step of mixing the transmitted signal and the received signal in a mixer to produce the difference signal.

17. A method for bandwidth synthesized radar level measurement as claimed in claim 15, further comprising the steps of:
receiving the sweep signal in a clock;
producing a clock signal from the clock;
receiving the clock signal in a chirp slope generator; and
generating a chirp slope signal from the chirp slope generator.

18. A method for bandwidth synthesized radar level measurement as claimed in claim 17, further comprising the steps of:
receiving the chirp slope signal and the difference signal in a selectable inverter;
producing a selectable inverter output from the selectable inverter;
receiving the selectable inverter output in a variable bandpass filter;
producing a continuous IF signal from the variable bandpass filter;
receiving the continuous IF signal in an automatic gain control (AGC) amplifier; and
producing the amplified IF signal from the AGC amplifier.

19. A method for bandwidth synthesized radar level measurement as claimed in claim 18, further comprising the steps of:
routing the sweep signal through a filter and a digital to analog (D/A) converter before entering the counter; and
monitoring the received signal in a return signal power sensor.

20. A method for bandwidth synthesized radar level measurement as claimed in claim 19, further comprising the steps of:
receiving the amplified IF signal in a return frequency tracking;
setting a sweep clock frequency in the chirp slope generator;
receiving the amplified IF signal in a return phase tracking; and
setting a sweep offset in the D/A converter.

21. A method for bandwidth synthesized radar level measurement as claimed in claim 20, further comprising the steps of:
controlling the chirp slope generator in response to the received signal in a sweep acquisition;
producing a sweep acquisition output from the sweep acquisition;
setting a number of cycles per sweep and the sweep acquisition output in a distance calculation/random access memory (RAM);
producing a distance calculation from a distance calculation/RAM;
receiving the clock signal and the distance calculation in a distance translator;
producing a distance signal from the distance translator;
receiving the distance signal in a data converter; and
producing the output signal from the data converter.

* * * * *